United States Patent [19]
Brookman

[11] Patent Number: 5,641,338
[45] Date of Patent: Jun. 24, 1997

[54] AIR SCRUBBER AND METHOD

[75] Inventor: David Lockerby Brookman, Charlotte, N.C.

[73] Assignee: EV-Air Systems, Inc., Charlotte, N.C.

[21] Appl. No.: 514,794

[22] Filed: Aug. 14, 1995

Related U.S. Application Data

[63] Continuation of Ser. No. 225,264, Apr. 8, 1994, abandoned.

[51] Int. Cl.$^6$ .................................................... B01D 47/02
[52] U.S. Cl. ...................... 95/213; 55/244; 55/256; 55/257.1; 95/216; 95/226; 261/114.1
[58] Field of Search ........................... 95/213, 216, 217, 95/226; 55/223, 233, 240, 244, 256, 228, 257.1; 261/20–22, 113, 114.1, 23.1; 422/4, 5, 124

[56] References Cited

U.S. PATENT DOCUMENTS

| | | | |
|---|---|---|---|
| Re. 14,146 | 6/1916 | Braemer | 95/217 X |
| 2,693,350 | 11/1954 | Ragatz | 261/114.1 |
| 2,787,453 | 4/1957 | Hibshman et al. | 261/114.1 X |
| 2,812,167 | 11/1957 | Wroth | 55/244 X |
| 3,392,655 | 7/1968 | Chambers et al. | 454/228 |
| 3,525,309 | 8/1970 | Katz | 55/244 X |
| 3,608,280 | 9/1971 | Martin | 55/256 X |
| 3,742,682 | 7/1973 | Ligutom | 55/244 X |
| 3,807,143 | 4/1974 | Dunn | 55/244 X |
| 4,684,379 | 8/1987 | Gambrell | 55/228 X |
| 4,810,268 | 3/1989 | Chambers et al. | 55/257.1 X |
| 4,954,294 | 9/1990 | Bannon | 261/114.1 |

*Primary Examiner*—Richard L. Chiesa
*Attorney, Agent, or Firm*—Ralph Bailey, P.A.

[57] ABSTRACT

An air scrubber and method for cleaning a stream of air utilizes a horizontal tray (A) together with a passageway (B) for transporting air beneath the trays and directing same upwardly through a perforated bottom of the tray which is supplied with a predetermined level of water which flows over a weir from a suitable source (C) wherein the upwardly directed air agitates the water resulting in a scrubbing action which is then followed by the action of an eliminator section (D) which removes water remaining in the air stream after agitation and scrubbing.

7 Claims, 3 Drawing Sheets

AIR SCRUBBER AND METHOD

This application is a continuation of U.S. patent application Ser. No. 08/225,264, filed Apr. 8, 1994, which is now abandoned.

BACKGROUND OF THE INVENTION

This invention relates to apparatus and method for removing contaminants from an air stream and more particularly illustrated as utilizing water flowing over horizontal impingement scrubbing trays to remove grease, smoke and odors as from restaurant kitchen exhaust systems from grills, griddles, fryers and the like. Coupled with this scrubber is a system fan mounted on a common base which can service one or more cook process stations.

Air handling and cleaning apparatus for industrial use has included horizontal structures commonly positioned on the roof of industrial plants and the like. Such horizontal units generally contain a fan at the entrance end for pushing air into the housing or a fan positioned at the exit end for pulling air through the housing. Included within the housing is generally a washer section wherein the air flow is subject to the action of a spray of water followed by an eliminator section wherein water remaining in the air after washing is removed. U.S. Pat. No. 3,392,655 is illustrative of the prior art. Variations on this theme are illustrated in U.S. Pat. Nos. 4,684,379 and 4,810,268.

Washing and cooling towers are commonly provided in the prior art as for hotels and office buildings and for scrubbing the smoke and grease laden air emanating from restaurants and cooking areas wherein water runs from the top of vertical towers through perforated trays in order to clean and cool air. Such devices are inefficient and expensive occupying substantial space and are unsightly for use with restaurants and the like.

The discharge or recirculation of grease and smoke laden air from cooking units contained in restaurants, especially fast food cooking areas, call for more efficient cleaning and cooling operation in order to facilitate effective competitive operations.

SUMMARY OF THE INVENTION

Accordingly, it is an important object of this invention to provide an air scrubber of increased effectiveness and it may be inexpensively constructed for cleaning and cooling an air stream for industrial use.

Another important object of the invention is the provision of an effective yet inexpensive apparatus and method for treating an air stream containing smoke and grease laden air from cooking areas which may be of generally horizontal construction.

Another important object of the invention is the provision of apparatus for effectively removing contaminants from an air stream wherein an air stream is introduced into a housing fitted with at least one horizontal tray having a perforated bottom having a passageway for conveying an air stream from the tray and directing same upwardly through the tray over which flows a supply of water at a predetermined depth wherein the air produces a vigorous washing action such as may occur in a dishwasher.

Another important object of the invention is to provide an air scrubber having a series of trays each lower than the preceding tray for creating a cascading effect wherein air is forcefully mixed and agitates the water during upward flow of the air stream through each of the trays.

Another object of the invention includes the provision of a grease skimmer in the form of a reservoir positioned at an exit end of the air scrubber for receiving an overflow of liquid over the upper lip of the discharge end of a scrubber for skimming off grease. Such a skimming operation preferably occurs with the discontinuance of the water supply and with the continuance of a flow of air to aid in skimming grease from the surface of the liquid.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
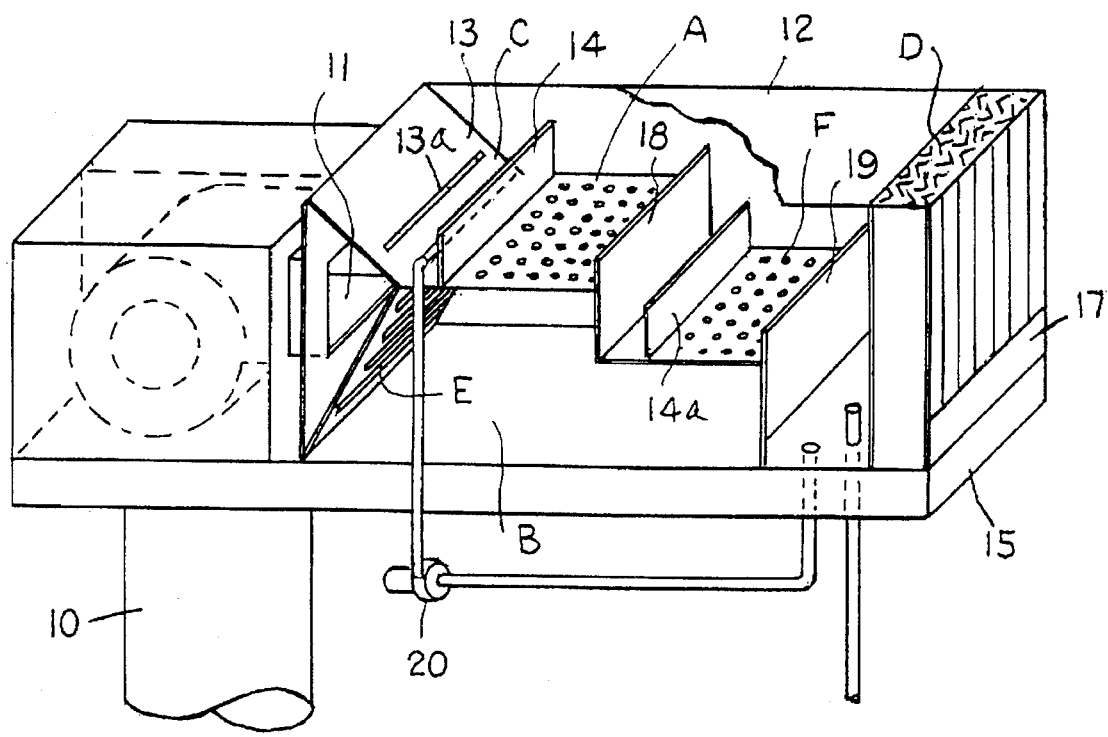
FIG. 1 is a perspective view illustrating an air scrubber constructed in accordance with the present invention wherein the air stream is ducted to an impeller fan located at the entrance end of a housing provided with trays having perforated bottoms for accommodating a cascading flow of water while air flows upwardly mixing and agitating the cascading flow of water.

The drawings illustrate a scrubber for cleaning an air stream having a housing having an entrance end receiving the air stream. A horizontal tray A has a perforated bottom extending across the housing. A passageway B below the tray carries the air stream directing at least a portion of the air stream upwardly through the perforated bottom of the horizontal tray. A source C of a flow of water across the tray which is agitated by the upwardly directed portion of the air stream includes a reservoir and a weir over which the flow of water cascades across the tray. An eliminator D receives air from the portion of the air stream for removing water therefrom preparatory to redirecting the air. An inclined perforated plate E extends across the air stream at the entrance end. At least one succeeding horizontal tray F has a perforated bottom extending across the housing below the first mentioned tray receiving a cascading flow of water therefrom for receiving a remaining portion of the air stream directed upwardly therethrough. Each tray terminates in an upright baffle forming an end frame member for a respective tray collecting a predetermined level of water in respective trays for agitating by a respective portion of the air stream. Skimming apparatus including a collection reservoir G may be provided at an exit end of the scrubber housing to collect floating contaminants such as grease.

For example, an air stream laden with grease and smoke may be exhausted from a cooking process through a capture hood (not shown) and carried through a duct 10 to the inlet of the scrubber fan 11. This fan discharges directly into an inlet of the scrubber housing 12 which directs the air downward with a sloped baffle 13 into a wetted perforated plate E. This wetted plate E reduces the velocity and disperses the high volume air stream and provides initial scrubbing action through the action of water dispensed from an opening 13a in the baffle upon the perforated plate B. The source of water C is defined by the inwardly inclined baffle 13 and a weir 14 over which water flows across the tray A. A second weir 14a is provided for the tray F.

Preferably, the housing 12 and the fan 11 and accessory elements are carried by a suitable structural base 15. A tank 16 is formed above the base by a bottom and sides of the housing and a vertical end wall 17.

The air stream travels horizontally through a passageway B to stepped impingement scrubbing trays A and F where the air turns upwardly 90° passing vertically through the trays. After passing through these trays, the air turns back 90° and moves toward the moisture eliminator section D. The stepped trays permit uniform airflow into and out of the tray screens forming the perforated bottoms, much like a tapered duct system. The eliminator section is a series of offset angles that cause the air stream to change direction several times. The inertial forces acting on the water particles as the air stream changes direction separate the moisture droplets from the air. A suitable eliminator is described in greater detail in the above U.S. Patents.

Figure 2:
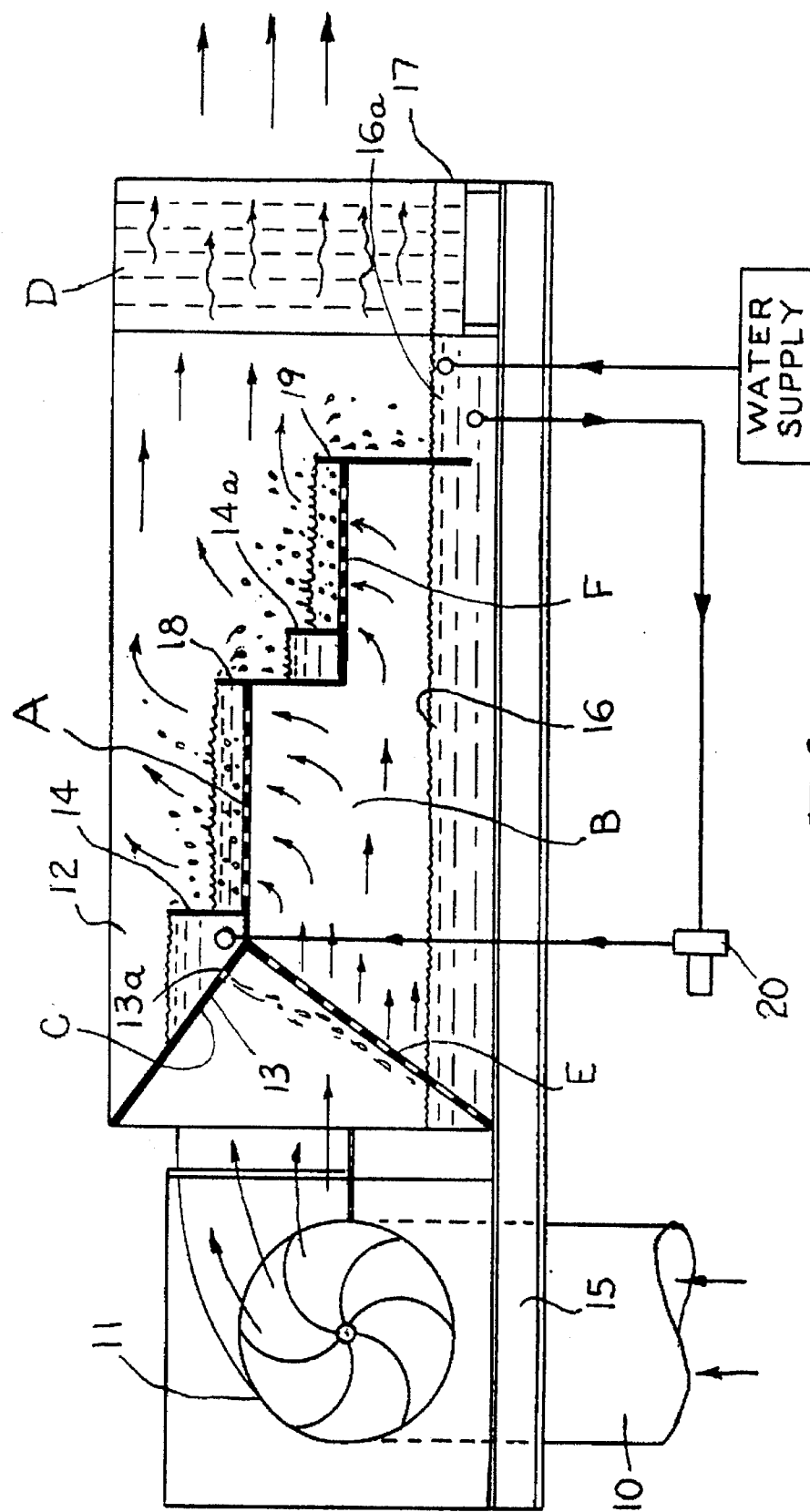
FIG. 2 is a side elevation further illustrating the apparatus shown in FIG. 1 illustrating the air flow path upwardly through the perforated bottom of the trays creating a scrubbing action together with a schematic representation of the water supply and recirculation through producing the cascading flow in the trays.
Figure 3:
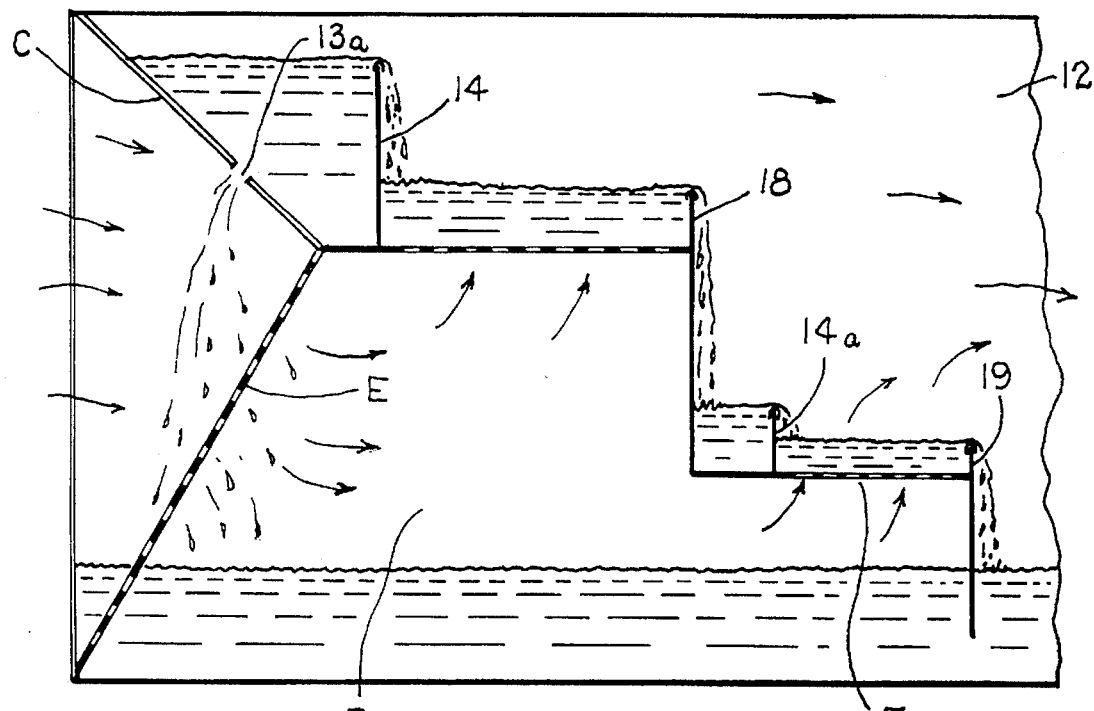
FIG. 3 is an enlarged side elevation further illustrating the cascading flow of water immediately prior its initiation of the flow of air through the action of the fan but illustrating the air flow paths through the use of arrows.
Figure 4:
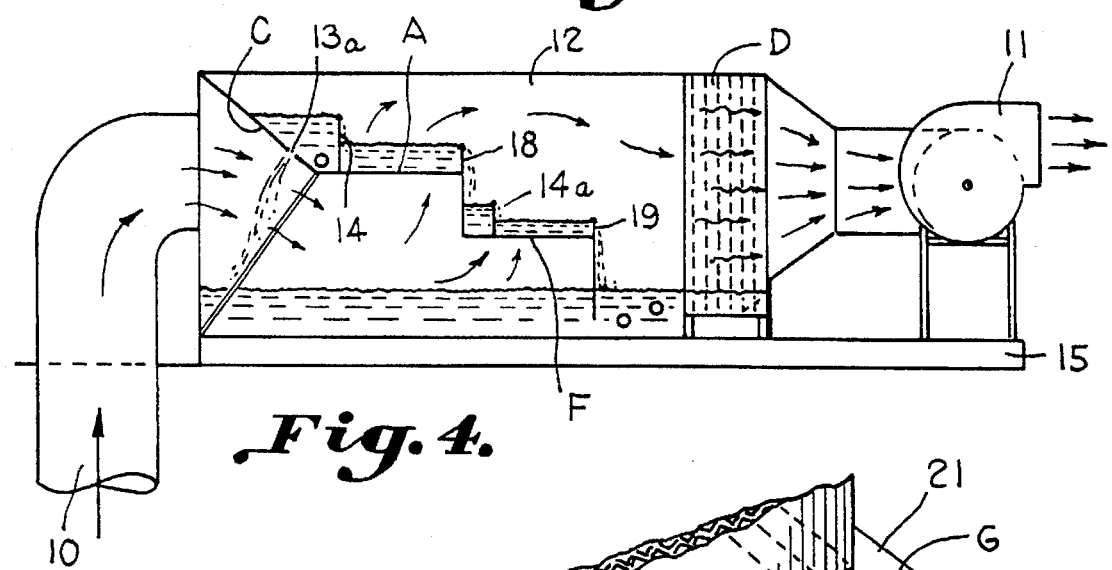
FIG. 4 illustrates a modified form of the invention wherein the fan is positioned at the exit end of the air scrubber and draws air from the entrance duct through the housing and the trays contained therein.

It is important to note that in addition to the perforated, screen like bottom each has an imperforate end plate 18 and 19 respectively which extend above the bottom to insure retention of a suitable depth of water to exert a suitable scrubbing action as the upwardly flowing air agitates the water in the trays mixing and removing impurities from the water by the violent action such as occurs in a dishwasher and illustrated in FIG. 2.

A suitable pump 20 recirculates water from the tank 16 to the reservoir C above the upwardly and inwardly inclined inlet baffle plate E. The water fills the reservoir spilling over the leveling weir 14 onto the first impingement tray A. There is a series of holes 13a which drops water onto the perforated distribution plate E. The incoming air disperses this water over and through the distribution plate. The height of the water in this reservoir is set to overcome the fan pressure on the inlet side of the scrubber. Water cascades from the first tray into a second reservoir with its leveling weir 14a. The water then falls onto the second impingement tray F, flowing across and over the side back down into the scrubbing tank. There is a division sheet which is a lower portion of the end plate 19 which extends from the second tray to just above the tank bottom to provide a seal between the dirty and clean sides of the scrubber. A 6" depth of water in the tank has been found suitable to act as a part of a seal design.

Figure 5:
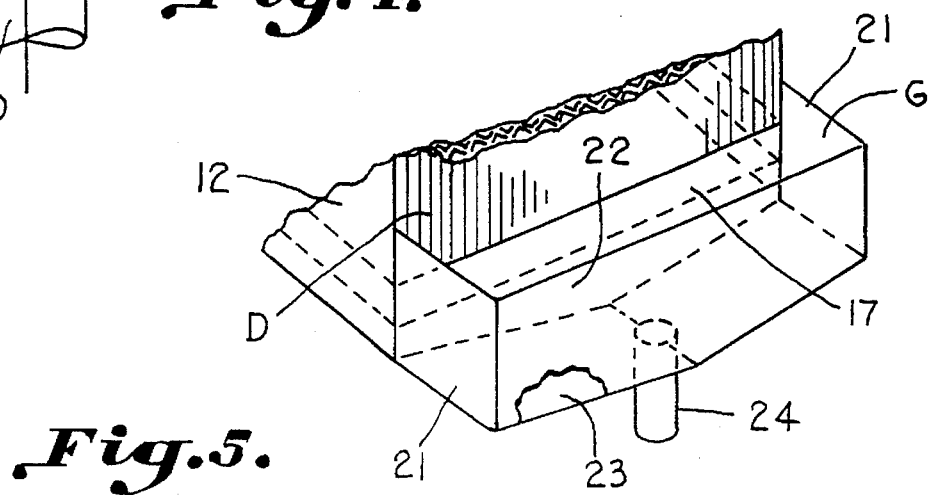
FIG. 5 is a perspective view illustrating a modified form of the invention wherein water flows over the upper lip of a tank contained in the lower portion of the housing to be received y a gutter or reservoir during the grease skimming operation.

FIG. 5 illustrates a modified form of the invention in which a skimming apparatus including a collection reservoir G is attached to the exit or air leaving the end of the scrubber. The apparatus includes a small gutter or reservoir which is mounted flush with the outlet lip of the end plate 17 of the tank. The sides 21 and back 22 of this gutter extend above the tank lip, and the top of this gutter may be partially covered (not shown). The bottom 23 is tapered from both sides to a drain 24 located in the center. Suitable drains (not shown) may be provided in other portions of the tank 16.

Not all of the collected grease will remain in suspension. This solidified grease will float on the water, primarily on the dirty side 16a (FIG. 2) of the tank division panel. Periodically a timer control (not shown) will shut down the recirculating pump. When this occurs, water will drain from the scrubber reservoir troughs into the tank raising its level. Since the normal operating water level is close to the height of the tank end panel, the rising water level will overflow into the discharge gutter. The solidified grease moves with the overflow and is further assisted by the constant air flow through the unit. This operation effectively skims the grease into a discharge drain thus purging the unit of solid waste. When the recirculating pump is restarted, the proper water level in the tank will be re-established through the fill control system.

It has been found that each impingement tray may have approximately 15% free area of small diameter holes through which the air passes. The flowing level of water on each tray may be about 2" in depth. The grease and smoke laden air interacts with the water as it passes through the small holes, thus creating the basic scrubbing action. The trays are removable from the bottom along with the distribution panel for ease of servicing.

Preferably, the apparatus includes an all stainless steel construction, and a detergent dispensing system to aid the scrubber in removing the grease from the air stream by keeping it in suspension to avoid an internal build up. Controls (not shown) may be provided to provide automatic fill, drain down and recirculation.

Thus, while grease removal units in common use are either not effective, maintenance intensive or extremely expensive, the subject air washer and method are relatively inexpensive, requires minimal maintenance and are very effective in the removal of grease and smoke.

While a preferred embodiment of the invention has been described using specific terms, such description is for illustrative purposes only, and it is to be understood that changes and variations may be made without departing from the spirit or scope of the following claims.

What is claimed is:

1. A scrubber for cleaning an air stream comprising:
   a housing having an entrance end receiving said air stream;
   a horizontal tray having a perforated bottom extending across said housing;
   a passageway below said tray carrying said air stream directing at least a portion of said air stream upwardly through said perforated bottom of said horizontal tray;
   an inclined perforated plate extending across said air stream at said entrance end;
   a weir distributing water to said tray, producing a flow of water across said tray;
   said water flowing across said tray being agitated by said upwardly directed portion of said air stream;
   a collection tank beneath said tray for collecting contaminants captured by said flow of water across said tray; and means for removing water from said air stream preparatory to redirecting said air.

2. The structure set forth in claim 1 including at least one succeeding horizontal tray having a perforated bottom extending across said housing below said first mentioned tray receiving a cascading flow of water therefrom for mixing with a remaining portion of said air stream directed upwardly therethrough.

3. The structure set forth in claim 2 wherein each said tray includes a reservoir and a weir over which the water cascades over respective trays; and an upright baffle forming an end frame member for said trays collecting a predetermined level of water in respective trays for agitation by a respective portion of said air stream.

4. The structure set forth in claim 3 including a tank beneath said trays collecting water from said trays; a water recirculating pump; and a collection reservoir receiving an overflow of water and floating contaminants from said tank.

5. The method of removing contaminants from an air stream containing grease, smoke, and other contaminants from cooking areas comprising the steps of:

receiving said air stream at an entrance end of a horizontal housing;

positioning a horizontal tray having a perforated bottom across said housing at an intermediate level forming a pair of horizontal passageways above and below said tray, respectively;

introducing said air stream in a horizontal flow beneath said horizontal tray and directing at least a portion thereof upwardly through the perforated bottom of the horizontal tray and thence continuing through said horizontal passageway above said tray horizontally in a direction away from said entrance end;

introducing and maintaining a flow of water at a predetermined level across said tray;

agitating said water across said tray by said upwardly directed air stream;

directing said air stream outwardly at an exit end of said housing opposite said entrance end;

removing water from said air stream adjacent said exit end; and collecting said water carrying said contaminants in a tank beneath said tray;

whereby said air stream is directed in a substantially horizontal direction away from said entrance end for scrubbing and for discharge from said exit end.

6. The method set forth in claim 5 including the steps of introducing a volume of air through an inclined perforated plate extending across said air stream at said entrance end; and positioning at least one succeeding horizontal tray having a perforated bottom across said housing below said first mentioned tray receiving a cascading flow of water therefrom for receiving a remaining portion of said air stream directed upwardly therethrough.

7. The method set forth in claim 5 including the step of causing said tank to overflow over an end plate and into a collection reservoir where water and floating contaminants are received aided by a flow of air over the surface of said water collected in the tank.

\* \* \* \* \*